United States Patent Office 3,796,769
Patented Mar. 12, 1974

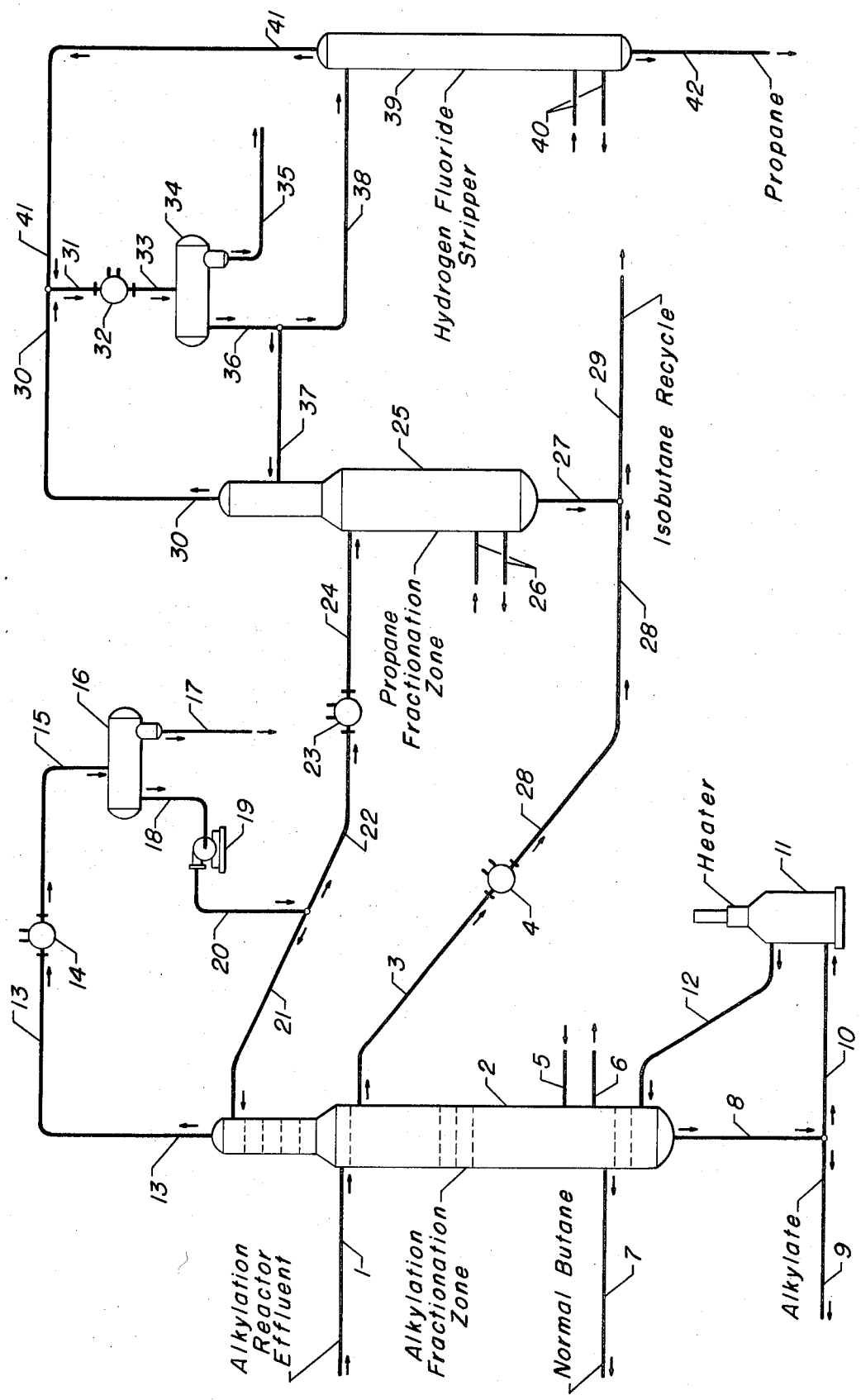

3,796,769
SEPARATING ALKYLATION HYDROCARBON EFFLUENT AT LOW FRACTIONATION PRESSURE
Dennis John Ward, South Barrington, Ill., assignor to Universal Oil Products Company, Des Plaines, Ill.
Filed Nov. 19, 1971, Ser. No. 200,551
Int. Cl. C07c 3/10
U.S. Cl. 260—683.43                5 Claims

ABSTRACT OF THE DISCLOSURE

A method for separating components of the hydrocarbon effluent from an isobutane-olefin alkylation reaction zone by charging the effluent to a fractionation zone maintained at a pressure below about 200 p.s.i.g.; removing an overhead fraction comprising propane and isobutane; condensing the overhead fraction and reintroducing a portion of the condensed overhead to said fractionation means; removing an isobutane side cut; removing a normal butane side cut; and removing alkylation reaction product in the bottoms from said fractionation zone.

BACKGROUND

This invention relates to a method for separating components of the hydrocarbon effluent from an isoparaffin-olefin alkylation reaction zone. In one aspect, this invention relates to a method for recovering a relatively pure isoparaffin stream from the hydrocarbon effluent from an alkylation reaction. In another aspect, this invention relates to a method for separating hydrocarbons at relatively low pressures and with small utilities requirements while providing an excellent separation of hydrocarbons.

Alkylation of isoparaffins with olefins using acid-acting catalysts such as hydrogen fluoride, sulfuric acid, etc., is of commercial importance in producing high octane motor fuel components. In such acid-catalyzed alkylation processes, typically, the isoparaffin and olefin reactants are contacted with the catalyst in an alkylation reactor. The isoparaffin normally utilized in commercial processes is isobutane, which is generally reacted with a mixture of butene isomers or a mixture of propylene and butene isomers to provide a reaction product consisting of $C_5$–$C_9$ isoparaffins. The $C_5$ and heavier products of the reaction are termed alkylate. In a typical alkylation process, the effluent from an alkylation reactor, comprising catalyst, unconsumed reactants and alkylate, is allowed to settle, forming a catalyst phase and a hydrocarbon phase. The catalyst phase is generally returned to the reactor, while the hydrocarbon phase is further processed to separate the alkylate from other hydrocarbons. The reaction between an isoparaffin, typically isobutane, and olefins in the alkylation reaction zone normally is undertaken with a large molar excess of the isoparaffin. When the reaction products, including alkylate, catalyst, isoparaffin, etc., are withdrawn from the reaction zone and settled to provide hydrocarbon and catalyst phases, the resulting hydrocarbon phase contains large amounts of isoparaffin which must be recovered and recycled to the alkylation reaction zone to insure economical operation. In commercial embodiments of conventional isoparaffin-olefin alkylation processes, some propane invariably is charged to the reactor with the isoparaffin and olefin feeds. Normally, some propane is also generated in the alkylation reaction zone during the alkylation reaction, particularly when propylene is included in the olefinic feed to the alkylation zone. The propane charged to or produced in the alkylation zone must be separated from the alkylate and the recycle isobutane in order to prevent an undesirable buildup in its concentration in the system. Various schemes have been disclosed in prior art for recovering unreacted isobutane and for separating and recovering propane. Typically, the hydrocarbon effluent from the alkylation reaction zone has been charged to fractionation means commonly known as a deisobutanizer or isostripper. Isobutane is recovered in the overhead vapors, and alkylate is removed in the bottoms. In one variation, propane is withdrawn as an overhead fraction, isobutane is removed as a side cut, and alkylate is removed as a bottoms fraction. In this variation, the fractionator must almost invariably be designed to operate at a pressure in excess of about 200 p.s.i.g., necessitating expense and inconvenience in fabricating and operating the fractionator. Similarly, other schemes have taught that a stream of propane and isobutane may be removed overhead from the isostripper, partially condensed to liquefy isobutane, and the liquefied isobutane combined with a side cut fraction of isobutane. Although the isostripper may operate at a reasonable pressure in such a scheme, the expense and complication of an embodiment of the scheme are evidence of a continuing unsolved problem in connection with attempts to separate components of the hydrocarbon effluent from an alkylation reaction zone.

SUMMARY

Accordingly, an object of this invention is to provide a method for separating components of the hydrocarbon effluent from an alkylation zone.

Another object of the present invention is to provide an efficient method for recovering isobutane for reuse in an alkylation reaction.

Still another object of the present invention is to provide a method for separating hydrocarbons at relatively mild separation conditions and with relatively small energy input requirements.

In an embodiment, the present invention relates to a method for separating components of the hydrocarbon effluent from an isobutane-olefin alkylation reaction zone which comprises the steps of: (a) introducing said hydrocarbon effluent into a fractionation zone maintained at fractionation conditions; (b) removing from said fractionation zone an overhead fraction comprising hydrocarbons having from about 3 to about 4 carbon atoms per molecule; (c) removing from said fractionation zone an isobutane side cut fraction at a locus below about the locus for introducing said effluent; (d) removing from said fractionation zone a bottoms fraction comprising alkylate; (e) condensing said overhead fraction to provide an overhead liquids stream; and, (f) introducing at least a portion of said overhead liquids stream into said fractionation zone at a locus above the locus for introducing said effluent.

In a specific, particular embodiment, the present invention relates to a method for separating components of the hydrocarbon effluent from an isobutane-olefin alkylation reaction zone which comprises: introducing said hydrocarbon effluent into the upper section of a fractionation zone maintained at fractionation conditions including a pressure less than about 200 p.s.i.g.; withdrawing an overhead fraction comprising isobutane and less than about 50 mole percent propane; withdrawing an isobutane side cut fraction comprising less than about 8 mole percent propane at a locus below the locus for introducing said effluent; withdrawing a normal butane side cut fraction at a locus below the locus for withdrawing said isobutane side cut fraction; withdrawing a bottoms fraction comprising alkylate; and, condensing said overhead fraction and introducing at least a portion of the condensed overhead fraction to said fractionation zone at a locus above the locus for introducing said effluent.

Further objects, embodiments and advantages of the method of the present invention will be more readily apparent from the following detailed description with reference to the attached drawing, which is a schematic representation of a preferred embodiment of the present invention.

PREFERRED EMBODIMENTS

The description of the present invention will be limited to a preferred embodiment of the method herein disclosed for handling the effluent from a conventional isobutane-olefin alkylation reaction zone; however, the scope of the invention is not necessarily to be limited thereto. The hydrocarbon effluent from the alkylation zone is produced by means well-known to the art, which, in general, comprise commingling the olefin-containing feed stock with an isobutane-containing feed stock and passing the mixture into a conventional alkylation reactor. Means for removing the heat of reaction from the alkllation reactor must be provided to insure an alkylate product of optimum quality. An alkylation catalyst such as hydrogen fluoride, sulfuric acid, etc., is contacted with the mixture in the reactor for periods sufficient to intimately mix and contact the catalyst and hydrocarbon mixture. The catalyst and hydrocarbons are removed from the reactor and passed into separation means whereby the catalyst is separated from the hydrocarbon effluent, typically by settling in a conventional settling zone. As used herein, the term "hydrocarbon effluent" is intended to embody the hydrocarbon phase which has been separated from the acid phase in such a settling zone. The catalyst phase produced by settling is returned to the reactor in admixture with fresh catalyst, if needed, and the hydrocarbon phase, as "hydrocarbon effluent," is further processed in accordance with the method of the present invention.

Conventional alkylation reaction conditions of temperature, pressure, isobtuane-olefin ratio and catalyst-hydrocarbon ratio may be employed with good results in the alkylation reaction zone contemplated herein. The alklation of isobutane with propylene, butylenes and amylenes can be carried out at a temperature between about 0° F. and about 200° F., preferably between about 50° F. and about 125° F., at pressures sufficiently high to maintain the reactants and catalyst as liquids, and at isobutane/olefin mole ratios between about 5:1 and about 20:1, preferably between about 10:1 and about 15:1. The volume ratio of catalyst to hydrocarbons in the reaction zone may advantageously be maintained between about 0.5:1 and about 10:1. When hydrogen fluoride is employed as the alkylation catalyst, the acid employed should have less than about 5 wt. percent water and comprise at least about 65 wt. percent titratable acid.

Referring to the attached drawing, the hydrocarbon effluent from an isobutane-olefin alkylation zone, substantially free from a major portion of hydrogen fluoride alkylation catalyst, is charged to alkylation fractionation zone 2 by way of conduit 1. The hydrocarbon effluent, comprising propane, n-butane, isobutane and $C_5^+$ alkylate, is introduced into fractionation zone 2 at a temperature between about 80° F. and about 130° F., preferably between about 100° F. and 120° F. The effluent is charged from conduit 1 into the upper section of fractionation zone 2 hereinafter more fully described. Fractionation zone 2 is maintained at fractionation conditions sufficient to produce the hereinafter described separations therein. Excellent results are achieved when fractionation conditions include a pressure less than about 200 p.s.i.g., and preferably from about 140 p.s.i.g. to about 180 p.s.i.g., an overhead vapors temperature between about 120° F. and about 140° F. and a bottoms liquid temperature generally between about 300° F. and about 370° F. depending on the degree of debutanization desired. At pressure higher than about 200 p.s.i.g. in fractionation zone 2, the satisfactory separation of alkylate, normal butane, isobutane, propane, etc., becomes difficult. The advantages of the present invention result, in part, from operation of the alkylation fractionation zone at the indicated low pressures, improving the relative volatility of the various components and reducing the requirements for heat input into the fractionation zone. Fractionation zone 2 can be, for example, a typical conventional fractionation vessel, and preferably comprises two sections, an upper, enriching section, and a lower fractionation section. Preferably the upper, enriching section is of smaller cross-section area than the lower section, and the lower section is preferably of greater vertical extension than the upper section. Both the upper, enriching section and the lower fractionation section preferably contain conventional trays or horizontal baffle sections to provide adequate separation of hydrocarbons, etc., charged to fractionation zone 2. Preferably, alkylation reaction effluent from conduit 1 is charged to fractionation zone 2 at or near the junction of the enriching and fractionation sections, and preferably at the top end of the lower fractionation section. A side cut fraction, comprising primarily isobutane, and containing at least about 50 wt. percent of the components charged via conduit 1 which are in the vapor phase at fractionation conditions in fractionation zone 2, is withdrawn from fractionation zone 2 at a point at or below the point where the material in conduit 1 is introduced into fractionation zone 2. This isobutane side cut fraction is removed via conduit 3, preferably between about 150° F. and about 200° F. as a vapor phase. The stream removed through conduit 3 contains less than about 8 mole percent propane and is substantially free from hydrogen fluoride. The isobutane side cut fraction in conduit 3 is passed into condenser 4 where it is cooled and liquefied. The alkylation fractionation zone utilized in the present method contains intermediate reboiling means located preferably in the lower fractionation section. Various suitable intermediate reboiling means are well known to those skilled in the art, including both external and internal types. One suitable internal reboiling means is depicted in the drawing. Heated reboiling fluid, e.g., steam, hot oil, etc., is passed into fractionation zone 2 through conduit 5 and passed in indirect heat exchange with hydrocarbons therein. The heat exchanged, cooled reboiling fluid is withdrawn from fractionation zone 2 and removed from the process through conduit 6. Further advantages of the present method of separation over prior art methods will be apparent to those skilled in the art from the use of intermediate reboiling means as indicated above. One primary advantage of such an operation in the present method is the type of heat energy which may be employed in the intermediate reboiler. For example, the heated reboiling fluid passed into conduit 5 may be a readily available heating fluid. Particularly preferred as a source of heat energy for the above-described reboiling means is a reboiling fluid which has previously been employed for heating or motive purposes and is thereby considered to be a low grade or low temperature source of heat. Such low grade heat sources are common in petroleum refining operations, and a variety of such sources will be apparent to those skilled in the art. Previously, such low grade energy sources have not been usable for reboiling purposes, as herein described, since high temperature level energy was required for reboiling. Because of the unique combination of the present method, the use of such low grade energy is now possible in an economical manner. Low grade reboiling fluid, e.g., steam, is passed into fractionation zone 2 through conduit 5 at a temperature preferably between about 210° F. and about 300° F., although higher temperature level sources can be used with an attendant savings in reboiler surface requirements, and is withdrawn via conduit 6, preferably at a temperature between about 200° F. and about 240° F. A normal butane side cut fraction is removed from fractionation zone 2 at a point below the locus of the reboiling means described above. By employing the method herein described, it is possible to remove a stream of substantially pure normal butane from fractionation zone 2. Prior art has conventionally employed such equipment as a normal butane rectifier to provide such a substantially pure stream of normal butane. The present method obviates the need for such extraneous operations, providing an economically superior process. The normal butane side cut fraction is removed from fractionation zone 2 at a temperature between about 190° F. and about 210° F. and passed out of the separation operation through conduit 7. A bottoms fraction or kettle product is withdrawn from fractionation zone 2 at a temperature between about 300° F. and about 370° F. and passed into conduit 8. The bottoms fraction in conduit 8 comprises $C_5$ and heavier hydrocarbons, herein termed alkylate, and is substantially free from, for example, normal butane, eliminating the need for a debutanizing operation which is commonly required in prior art separation methods, particularly in embodiments wherein a normal butane rectifier is not employed. The bottoms fraction removed in conduit 8 is divded into portions, one portion being passed into conduit 9 and the other into conduit 10. The portion of alkylate in conduit 9 is withdrawn from the separation operation as the alkylate product of the process. The portion of bottoms fraction passed into conduit 10 is passed through fired heater 11, wherein the hydrocarbons are heated to a temperature in the range from about 350° F. to about 450° F. The heated materials are removed from heater 11 and passed through conduit 12 to fractionation zone 2. The heated bottoms fraction is reintroduced into fractionation zone 2 for reboiling purposes at a point below the locus in zone 2 from which the normal butane side cut is removed via conduit 7. Because of the intermediate reboiling means employed, the portion of bottoms utilized for reboiling is smaller in the present method than that typically employed in prior art methods.

Referring to the upper, enriching section of fractionation zone 2, an overhead fraction is removed from the top of zone 2 at a temperature between about 110° F. and about 140° F. The overhead fraction contains less than about 50 mole percent propane, and preferably less than about 35 mole percent propane. Excellent results can be achieved by maintaining the propane concentrations in the overhead fraction at about 25 mole percent, and withdrawing the overhead fraction from fractionation zone 2 at a temperature of about 130° F. The overhead fraction comprises, besides propane, isobutane, and, in the preferred embodiment herein described, contains some hydrogen fluoride. For example, the overhead fraction may typically contain about 60 mole percent isobutane, about 25 mole percent propane and about 15 mole percent hydrogen fluoride. The overhead fraction is passed through conduit 13 to condenser 14, wherein the overhead fraction is completely condensed into the liquid phase, for example, by cooling the overhead fraction to a temperature of about 100° F. The liquefied overhead fraction is removed from condenser 14 and pased through conduit 15 to settler 16. In settler 16, hydrogen fluoride in the overhead fraction, which may settle into a lower separate liquid phase, can be removed through conduit 16 and, for example, passed to a conventional alkylation reaction zone, if desired. The liquids in settler 16, after withdrawing a separated hydrogen fluoride phase, if required, are removed via conduit 18, passed through pump 19, and charged to conduit 20. The liquefied overhead fraction in conduit 20 is divided into two portions. One portion of the liquefied overhead fraction is passed from conduit 20 into conduit 21 and introduced into fractionation zone 2 near the top of the upper, enriching section. The liquids in conduit 21 are introduced into zone 2 at a temperature in the range from about 80° F. to about 120° F. and preferably at about 100° F. The liquefied overhead fraction, thus introduced, acts, in part, to reflux the vapors ascending through the enriching section of fractionation zone 2, providing an increased separation between, for example, propane and isobutane in the enriching section. Thus, the fractional portion of liquefied overhead fraction from conduit 20 which is passed through conduit 21, will, in general, be a portion sufficient to provide optimum operation using, for example, conventional trays which may be provided in the enriching section. The remaining major portion of liquefied overhead fraction from conduit 20 is passed through conduit 22 to heater 23, heated thereinto a temperature of, for example, about 160° F., and withdrawn via conduit 24. The heated portion of overhead fraction in conduit 24 is passed to propane fractionation zone 25. In propane fractionation zone 25, isobutane is separated from propane and hydrogen fluoride. Fractionation zone 25 includes reboiling means 26. A bottoms stream, comprising isobutane, is withdrawn at a temperature in the range from about 200° F. to about 250° F., cooled by heat exchange means not shown, and passed through conduit 27. Liquefied isobutane side cut fraction in condenser 4 is withdrawn and passed through conduit 28. The liquid isobutane streams in conduits 27 and 28 are combined in conduit 29. The isobutane stream in conduit 29 can, if desired, be conveniently recycled to a conventional alkylation reaction zone. Alternately, one or both of the isobutane-containing streams in conduits 27 and 28 may be utilized for other purposes. For example, a portion of relatively high temperature hydrocarbons from conduit 27 may be utilized in a conventional hydrogen fluoride regeneration scheme in a manner well known to the art. Returning to propane fractionation zone 25, which is maintained at a pressure of about 300 p.s.i.g. to about 350 p.s.i.g., an overhead stream, comprising propane and hydrogen fluoride, is removed through conduit 30 at a temperature of about 125° F. to about 150° F., and passed through conduit 31 to condenser 32, wherein the overhead stream is liquefied and cooled to about 100° F. The cooled stream is withdrawn and passed through conduit 33 to settler 34. Hydrogen fluoride, which forms a separate phase upon settling in settler 34, can be removed via conduit 35 and, if desired, may be charged to a conventional alkylation reaction zone. Liquefied propane and hydrogen fluoride are withdrawn from settler 34 through conduit 36 and divided into two portions. One portion is passed through conduit 37 to propane fractionation zone 25. The other portion is passed through conduit 38 to hydrogen fluoride stripper 39, which is equipped with reboiling means 40. A mixture of hydrogen fluoride and propane is removed overhead from stripper 39 and passed through conduit 31, wherein it is combined with overhead from fractionation zone 25. A bottoms stream comprising substantially pure propane is removed from stripper 39 through conduit 42 and recovered as a secondary product of the alkylation process.

It can be seen from the foregoing that the separation operation herein disclosed provides a novel and efficient method for separating components of the hydrocarbon effluent from an alkylation zone to provide alkylate, normal butane, isobutane, etc. Some conventional equipment necessary for the method has not been described, but will be apparent to those skilled in the art, both as to its setting in the separation scheme and its operation.

I claim as my invention:

1. A method for separating components of the hydrocarbon effluent from an alkylation reaction zone in which isobutane is alkylated with an olefinic reactant in the presence of a catalyst, which method comprises the steps of:
    (a) separating the catalyst from said hydrocarbon effluent;
    (b) introducing said hydrocarbon effluent into a fractionation vessel comprising an upper enriching section, and a lower fractionation section, said vessel maintained at fractionation conditions including a pressure less than about 200 p.s.i.g.;

(c) removing from said upper enriching section an overhead fraction comprising isobutane and less than about 50 mole percent propane;

(d) removing from said fractionation zone an isobutane side cut fraction comprising less than about 8 mole percent propane, said isobutane fraction being withdrawn as a vapor phase at a locus below the locus for introducing said effluent;

(e) removing from said fractionation zone a substantially pure normal butane side cut fraction below said locus for withdrawing said isobutane side cut fraction;

(f) reboiling the hydrocarbon effluent in said fractionation zone, utilizing an intermediate reboiling means located in said lower fractionation section;

(g) removing from said fractionation zone a bottoms fraction comprising alkylate;

(h) condensing at least a portion of said overhead fraction to provide an overhead liquid stream; and (i) introducing at least a portion of said overhead liquid stream into said fractionation means at a locus above said locus for introducing said effluent.

2. The method of claim 1 further characterized in that said effluent is introduced at the upper end of said fractionation section, and at least a portion of said overhead liquid stream is introduced into said enriching section.

3. The method of claim 1 further characterized in that a portion of said overhead liquid stream is fractionated to provide an isobutane stream and a propane stream and at least a portion of said isobutane stream and at least a portion of said isobutane side cut fraction are introduced into said alkylation reaction zone.

4. The method of claim 1 further characterized in that said olefinic reactant is a mono-olefinic hydrocarbon having from about 3 to about 5 carbon atoms per molecule.

5. The method of claim 1 further characertized in that pressure in said fractionation vessel is maintained at a pressure of from about 140 p.s.i.g. to about 180 p.s.i.g.

References Cited

UNITED STATES PATENTS

| 3,254,137 | 5/1966 | Hutto et al. | 260—683.48 |
| 2,990,437 | 6/1961 | Berger | 260—683.43 |
| 3,579,603 | 5/1971 | Jones | 260—683.48 |
| 3,249,650 | 5/1966 | Fenske | 260—683.48 |

DELBERT E. GANTZ, Primary Examiner

G. J. CRASANAKIS, Assistant Examiner

U.S. Cl. X.R.

260—683.48